United States Patent [19]

Senda et al.

[11] Patent Number: 4,705,566

[45] Date of Patent: Nov. 10, 1987

[54] POLISHING COMPOSITION FOR MEMORY HARD DISC

[75] Inventors: Tetsuji Senda; Takashi Baba, both of Aichi, Japan

[73] Assignee: Fujimi Kenmazai Kogyo Kabushiki Kaisha, Japan

[21] Appl. No.: 865,984

[22] Filed: May 21, 1986

[30] Foreign Application Priority Data

Jul. 25, 1985 [JP] Japan ................................ 60-164779

[51] Int. Cl.$^4$ ............................................. C09G 1/02
[52] U.S. Cl. ........................................ 106/3; 51/309
[58] Field of Search ............................. 106/3; 51/309

[56] References Cited

U.S. PATENT DOCUMENTS

| | | | |
|---|---|---|---|
| 3,930,870 | 1/1976 | Basi ............................ | 106/3 |
| 4,021,263 | 5/1977 | Rosenblum .................... | 51/309 |
| 4,225,349 | 9/1980 | Koshiyama et al. .......... | 106/3 |
| 4,475,981 | 10/1984 | Rea ............................. | 51/307 |
| 4,601,755 | 7/1986 | Mélard et al. ................ | 106/3 |

*Primary Examiner*—Paul Lieberman
*Assistant Examiner*—Willie J. Thompson
*Attorney, Agent, or Firm*—Lowe, Price, LeBlanc, Becker & Shur

[57] ABSTRACT

A composition for polishing a layer of non-electrolysis nickel plating, an alumite layer or an aluminum substrate in a memory hard disc the composition comprising water, a polishing agent of aluminum oxide, and a polishing accelerator of one of nickel nitrate and aluminum nitrate, or two compounds, nickel nitrate and aluminum nitrate, or two compounds, nickel sulfate and aluminum nitrate.

12 Claims, No Drawings

POLISHING COMPOSITION FOR MEMORY HARD DISC

BACKGROUND OF THE INVENTION

The present invention relates to polishing compositions, particularly compositions for polishing memory hard discs of computers, word processors or the like.

A memory hard disc is usually made in a process where a surface of a substrate of aluminium is polished, and a layer of magnetic storage medium is formed on the smoothed surface of the substrate. In recent years, a memory hard disc has been made by a process where a layer of non-electrolysis nickel plating, also called chemical nickel plating, or a layer of alumite is formed on a substrate of aluminium to form a pre-treated surface, the pre-treated surface is polished, and a layer of magnetic storage medium is formed on the smoothed pre-treated surface.

In any memory hard disc, a general-purpose polishing slurry formulated by suspending a polishing agent of aluminium oxide in water is used for the polishing.

However, the general-purpose polishing slurry is low in the polishing amount and low in the polishing efficiency for a memory hard disc. Moreover, surface defects such as orange peels, may be produced and the polishing quality is low, and therefore the general-purpose polishing slurry is not practicable. Consequently, a polishing composition for a memory hard disc has been desired.

SUMMARY OF THE INVENTION

In view of the above-mentioned needs, an object of the invention is to provide a polishing composition which is capable of polishing a memory hard disc at high efficiency and high quality.

The inventors have discovered that when one of the compounds, nickel nitrate and aluminium nitrate, is added to a slurry formulated by suspending a polishing agent of aluminium oxide in water, or when two compounds, nickel nitrate and aluminium nitrate, or two compounds, nickel sulfate and aluminium nitrate, are added thereto, any of the slurries after addition is excellent as a polishing composition for a memory hard disc.

The invention is based on the above-mentioned discovery. That is, the invention consists in a polishing composition which comprises water, a polishing agent of aluminium oxide, and a polishing accelerator of one of nickel nitrate and aluminium nitrate, or two compounds, nickel nitrate and aluminium nitrate, or two compounds, nickel sulfate and aluminium nitrate.

The polishing composition of the invention, as clearly seen from a description of the results of comparative tests which will hereinafter appear, can polish a memory hard disc at higher efficiency and higher quality than in the prior art.

DETAILED DESCRIPTION OF THE PREFERRED EMBODIMENT

A polishing composition embodying the invention is composed of a slurry formulated by suspending a polishing agent of $\alpha$-aluminium oxide ($\alpha$-$Al_2O_3$) in pure water or deionized water and adding thereto a polishing accelerator listed as follows:

Polishing Accelerators
(1) nickel nitrate ($Ni(NO_3)_2 \cdot 6H_2O$)
(2) aluminium nitrate ($Al(NO_3)_3 \cdot 9H_2O$)
(3) nickel sulfate ($NiSO_4 \cdot 6H_2O$) and aluminium nitrate ($Al(NO_3)_3 \cdot 9H_2O$)
(4) nickel nitrate ($Ni(NO_3)_2 \cdot 6H_2O$) and aluminium nitrate ($Al(NO_3)_3 \cdot 9H_2O$)

The polishing accelerator is contained in solution in the slurry at 1~20% by weight.

The polishing agent is contained at 2~30% by weight, and has a mean particle size of 0.7~4.0 $\mu$m and maximum particle size of 20 $\mu$m or less.

The polishing agent of $\alpha$-aluminium oxide is prepared by calcining granular boehmite ($Al_2O_3 \cdot H_2O$, AlO(OH)) at a temperature of 1,100°~1,200° C. for 2 to 3 hours, crushing relatively large particles into finer particles and separating particles falling within a predetermined particle size distribution.

In order to polish a memory hard disc using a polishing composition of the embodiment, the polishing composition is supplied into a clearance between a surface of the memory hard disc to be polished and a surface of a polishing pad which is slidable on the surface of the memory hard disc in manner similar to the prior art.

Description will now be made of a series of comparative tests conducted to ascertain the advantages of the invention.

A group of polishing compositions embodying the invention were prepared in the form of slurries, each formulated by suspending a polishing agent of $\alpha$-aluminium oxide ($\alpha$-$Al_2O_3$) in deionized water and adding thereto a polishing accelerator as hereinafter listed at following weight percent.

|       | Polishing Accelerators and Weight Percent |      |
|-------|-------------------------------------------|------|
| (1)   | nickel nitrate ($Ni(NO_3)_2 \cdot 6H_2O$) | 10%  |
| (2)   | aluminium nitrate ($Al(NO_3)_3 \cdot 9H_2O$) | 10% |
| (3.1) | nickel sulfate ($NiSO_4 \cdot 6H_2O$)     | 4%   |
|       | aluminium nitrate ($Al(NO_3)_3 \cdot 9H_2O$) | 6% |
|       | total                                     | 10%  |
| (3.2) | nickel sulfate ($NiSO_4 \cdot 6H_2O$)     | 2%   |
|       | aluminium nitrate ($Al(NO_3)_3 \cdot 9H_2O$) | 3% |
|       | total                                     | 5%   |
| (4.1) | nickel nitrate ($Ni(NO_3)_2 \cdot 6H_2O$) | 4%   |
|       | aluminium nitrate ($Al(NO_3)_3 \cdot 9H_2O$) | 6% |
|       | total                                     | 10%  |
| (4.2) | nickel nitrate ($Ni(NO_3)_2 \cdot 6H_2O$) | 2%   |
|       | aluminium nitrate ($Al(NO_3)_3 \cdot 9H_2O$) | 3% |
|       | total                                     | 5%   |

In a polishing composition of the prior art, a slurry of the polishing composition of the invention without addition of the polishing accelerator is used.

In the polishing slurries of the invention and the prior art, the polishing agent is contained at 20% by weight, and has mean particle size of 1.3 $\mu$m and maximum particle size of 20 $\mu$m or less.

The polishing agent of $\alpha$-aluminium oxide was prepared by calcining granular boehmite ($Al_2O_3 \cdot H_2O$, AlO(OH)) at a temperature of 1,150° C. for 3 hours, crushing relatively large particles into finer particles and separating particles falling within a predetermined particle size distribution.

a. Non-electrolysis nickel . phosphorus plating

A memory hard disc is constituted by forming layers of non-electrolysis nickel . phosphorus ($N_{i-P}$) plating each to a thickness of 30 $\mu$m on both surfaces of a circular ring-shaped substrate of aluminium having outer diameter of 130 mm. The plating layer is formed in a chemical composition of nickel 90~92% and phosphorus 8~10%.

The disc was installed to a double sided polishing machine, with suede polishing pads abutting on the plating layers of both surfaces of the disc. The disc and each polishing pad were slid relative to each other, and the disc was polished for 10 minutes. During polishing, the polishing slurry of the invention and the prior art was supplied between the disc and both polishing pads at rate of 0.1l/min. The polishing pressure was 50 g/cm$^2$.

After polishing, the polished surface of the plating layers on both surfaces of the disc were examined for the presence of surface defects. Then, thickness of the disc was measured and the thickness decrease at both surfaces due to the polishing was calculated so as to obtain the removal rate.

The test results are shown in Table 1 below.

TABLE 1

| Polishing Accelerator | Polishing Accelerator by weight % | pH Value (25° C.) | Removal Rate μm/10 min | Surface Defect |
|---|---|---|---|---|
| Prior Art | | | | |
| none | 0 | 7.0 | 3.1 | orange peels |
| Invention | | | | |
| (1) nickel nitrate | 10 | 6.4 | 6.0 | none |
| (2) aluminium nitrate | 10 | 3.2 | 7.4 | " |
| (3.1) nickel sulfate & aluminium nitrate | 10 | 3.6 | 7.0 | " |
| (3.2) nickel sulfate & aluminium nitrate | 5 | 3.8 | 5.2 | " |
| (4.1) nickel nitrate & aluminium nitrate | 10 | 3.5 | 6.8 | " |
| (4.2) nickel nitrate & aluminium nitrate | 5 | 3.7 | 5.0 | " |

As seen from Table 1 above, the polishing slurry of the invention provides a higher removal rate of a non-electrolysis nickel . phosphorus plating layer, i.e., a better polishing efficiency than that of the prior art, and no surface defect is found therefore the polished surface has high quality.

b. Non-electrolysis nickel . boron plating

A memory hard disc is constituted by forming layers of non-electrolysis nickel . boron (Ni-B), plating each to a thickness of 30 μm on both surfaces of a circular ring-shaped substrate of aluminium having an outer diameter of 130 mm. The plating layer is formed in a chemical composition of nickel 99.0~99.5% and boron 0.5~1.0%.

The disc was polished in manner similar to the polishing tests of layers of non-electrolysis nickel . phosphorus plating.

The test results are shown in Table 2 below.

TABLE 2

| Polishing Accelerator | Polishing Accelerator by weight % | pH Value (25° C.) | Removal Rate μm/10 min | Surface Defect |
|---|---|---|---|---|
| Prior Art | | | | |
| none | 0 | 7.0 | 2.1 | orange peels |
| Invention | | | | |
| (1) nickel nitrate | 10 | 6.4 | 5.0 | none |
| (2) aluminium nitrate | 10 | 3.2 | 6.3 | none |

As seen from Table 2 above, the polishing slurry of the invention provides a higher removal rate of a non-electrolysis nickel . boron plating layer, i.e., a better polishing efficiency than that of the prior art, and no surface defect is found and therefore the polished surface has high quality.

c. Alumite

A memory hard disc is constituted by forming layers of sulfate alumite in place of layers of non-electrolysis nickel plating.

The disc was polished in similar manner to the polishing tests of layers of non-electrolysis nickel plating. The test results are shown in Table 3 below.

TABLE 3

| Polishing Accelerator | Polishing Accelerator by weight % | pH Value (25° C.) | Removal Rate μm/10 min | Surface Defect |
|---|---|---|---|---|
| Prior Art | | | | |
| none | 0 | 7.0 | 1.0 | orange peels |
| Invention | | | | |
| (1) nickel nitrate | 10 | 6.4 | 5.3 | none |
| (2) aluminium nitrate | 10 | 3.2 | 7.6 | none |

As seen from Table 3 above, the polishing slurry of the invention provides a higher polishing efficiency of an alumite layer and higher polishing quality than that of the prior art.

d. Aluminium

A memory hard disc is a substrate of aluminium itself without forming a layer of non-electrolysis nickel plating or an alumite layer.

The disc was polished in similar manner to the above-mentioned cases, and the test results are shown in Table 4 below.

TABLE 4

| Polishing Accelerator | Polishing Accelerator by weight % | pH Value (25° C.) | Removal Rate μm/10 min | Surface Defect |
|---|---|---|---|---|
| Prior Art | | | | |
| none | 0 | 7.0 | 1.5 | orange peels |
| Invention | | | | |
| (1) nickel nitrate | 10 | 6.4 | 6.8 | none |
| (2) aluminium nitrate | 10 | 3.2 | 8.0 | " |
| (3.1) nickel sulfate & aluminium nitrate | 10 | 3.6 | 7.5 | " |
| (3.2) nickel sulfate & aluminium nitrate | 5 | 3.8 | 6.0 | " |
| (4.1) nickel nitrate & aluminium nitrate | 10 | 3.5 | 7.0 | " |
| (4.2) nickel nitrate & aluminium nitrate | 5 | 3.7 | 5.3 | " |

As seen from Table 4 above, the polishing slurry of the invention provides a better polishing efficiency of aluminium and higher polishing quality than that of the prior art.

What we claim is:

1. A polishing composition for a memory hard disc, comprising water, a polishing agent of aluminum oxide, and a polishing accelerator selected from the group consisting of nickel nitrate, mixtures of nickel nitrate and aluminum nitrate, and mixtures of nickel sulfate and aluminum nitrate.

2. A polishing composition comprising water, a polishing agent of aluminium oxide, and a polishing accelerator of nickel nitrate and aluminium nitrate.

3. A polishing composition comprising water, a polishing agent of aluminium oxide, and a polishing accelerator of nickel sulfate and aluminium nitrate.

4. A polishing composition as set forth in claim 1, wherein the polishing accelerator is contained in an amount of 1~20% by weight.

5. A polishing composition as set forth in claim 2, wherein the polishing accelerator is contained at 1~20% by weight.

6. A polishing composition as set forth in claim 3, wherein the polishing accelerator is contained at 1~20% by weight.

7. A polishing composition as set forth in claim 4, wherein the polishing agent is contained in an amount of 2~30% by weight, and has a mean particle size of 0.7~4.0 μm and maximum particles size of 20 μm or less.

8. A polishing composition as set forth in claim 5, wherein the polishing agent is contained at 2~30% by weight, and has mean particle size of 0.7~4.0 μm and maximum particle size of 20 μm or less.

9. A polishing composition as set forth in claim 6, wherein the polishing agent is contained in an amount of 2~30% by weight, and has a mean particle size of 0.7~4.0 μm and maximum particle size of 20 μm or less.

10. A polishing composition as set forth in claim 7, wherein the polishing agent is α-aluminium oxide prepared by calcining granular boehmite at a temperature of 1,100°~1,200° C. for 2 to 3 hours, crushing relatively large particles into finer particles and separating particles falling within a predetermined particle size distribution.

11. A polishing composition as set forth in claim 8, wherein the polishing agent is α-aluminium oxide prepared by calcining granular boehmite at a temperature of 1,100°~1,200° C. for 2 to 3 hours, crushing relatively large particles into finer particles and separating particles falling within a predetermined particle size distribution.

12. A polishing composition as set forth in claim 9, wherein the polishing agent is α-aluminium oxide prepared by calcining granular boehmite at a temperature of 1,100°~1,200° C. for 2 to 3 hours, crushing relatively large particles into finer particles and separating particles falling within a predetermined particle size distribution.

* * * * *